US007400895B2

United States Patent
Chang et al.

(10) Patent No.: US 7,400,895 B2
(45) Date of Patent: Jul. 15, 2008

(54) APPARATUS AND METHOD FOR RECOVERING DISCONNECTED COMMUNICATION LINK IN MOBILE COMMUNICATION SYSTEM

(75) Inventors: Sun-Ny Chang, Suwon-si (KR); Yun-Sang Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 601 days.

(21) Appl. No.: 11/001,868

(22) Filed: Dec. 2, 2004

(65) Prior Publication Data
US 2005/0255870 A1    Nov. 17, 2005

(30) Foreign Application Priority Data
May 12, 2004   (KR) ................... 10-2004-0033452

(51) Int. Cl.
*H04B 7/00*   (2006.01)
*H04B 17/00*  (2006.01)
*H04Q 7/20*   (2006.01)
*H04B 1/00*   (2006.01)

(52) U.S. Cl. ................. 455/502; 455/436; 455/439; 455/67.11

(58) Field of Classification Search ............... 455/450, 455/550.1, 422.1, 502, 436, 439, 453, 67.11; 370/350, 328, 329
See application file for complete search history.

(56) References Cited

U.S. PATENT DOCUMENTS

| 5,790,527 | A  | * | 8/1998 | Janky et al. ............. 370/330 |
| 5,943,334 | A  | * | 8/1999 | Buskens et al. .......... 370/350 |
| 7,272,399 | B2 | * | 9/2007 | Han ....................... 455/450 |
| 7,324,487 | B2 | * | 1/2008 | Saito ...................... 370/338 |

* cited by examiner

*Primary Examiner*—Tilahun Gesesse
*Assistant Examiner*—Denise Hopkins
(74) *Attorney, Agent, or Firm*—The Farrell Law Firm, PC

(57) ABSTRACT

Disclosed is an apparatus and method for recovering a communication link between a Mobile Station (MS) and a Base Station System (BSS) in a mobile communication system when the communication link is disconnected while a communication service is in progress. When detecting the disconnection, the MS stores information of the communication link. If the MS acquires synchronization with the BSS within a predetermined time period from the detection, it resumes the communication service through the communication link. Upon the disconnection, the BSS stores resource and other information of the MS. If the BSS detects that the MS has acquired synchronization with the BSS within the predetermined time period from the disconnection, the BSS resumes the communication service through the communication link. This ensures a stable communication service in a mobile communication system that has many radio dead zones where the MS cannot normally receive services.

12 Claims, 4 Drawing Sheets

APPARATUS AND METHOD FOR RECOVERING DISCONNECTED COMMUNICATION LINK IN MOBILE COMMUNICATION SYSTEM

This application claims priority to an application entitled "APPARATUS AND METHOD FOR RECOVERING DISCONNECTED COMMUNICATION LINK IN MOBILE COMMUNICATION SYSTEM," filed in the Korean Intellectual Property Office on May 12, 2004 and assigned Ser. No. 2004-33452, the contents of which are incorporated herein by reference.

BACKGROUND OF THE INVENTION

1. Field of the Invention

The present invention relates to an apparatus and method for recovering a disconnected communication link in a mobile communication system, and more particularly to an apparatus and method for reducing the overhead of resynchronization for a reconnection to a communication link which was disconnected during communication with a base station system in a mobile communication system.

2. Description of the Related Art

Unlike a wired link, a wireless channel between a Mobile Station (MS) (also called a "mobile communication terminal") and a base station in a mobile communication system is affected by many external environmental factors. For example, while in motion, an MS connected to a base station through a wireless channel can enter a radio dead zone in which radio waves cannot reach, or enter the service area of another base station which is outside the service area of the first base station. As the MS moves from the service area of one base station to the service area of another base station, a wireless channel established with the MS is often abnormally disconnected (which terminates a communication service in progress) due to various factors, such as, failure to hand-off the communication service in progress from one wireless channel of one base station to another wireless channel of another base station.

FIG. 1 is a flow diagram showing a conventional method for recovering a communication link that is disconnected while an MS 100 is in communication with a Base Station System (BSS) 102 in a general mobile communication system. Here, it is assumed that a communication link, composed of a wireless channel SCHI, is established between the MS 100 and the BSS 102 (as shown in step 110). If a synchronization failure event occurs (i.e., if the communication link is disconnected) at step 112 (while the MS 100 is in communication with the BSS 102 at step 110), the MS 100 releases all resources for communication with the BSS 102 at step 114. Thereafter, the MS 100 attempts to reestablish a communication link with the BSS 102. Upon detecting that the communication link has disconnected, the BSS 102 performs a procedure for terminating all services in progress for communication with the MS 100 at step 116.

As described above, if the communication link with the MS 100 is disconnected, the BSS 102 generally terminates all services in progress for the communication with the MS 100, and the MS 100 attempts to reestablish a communication link with the BSS 102. If the MS 100 fails to reestablish a communication link with the BSS 102, the MS 100 must reestablish a communication link with a new BSS through handoff, and then reconnect to (or restart) services for communication with the new BSS.

When the MS 100 momentarily passes through a radio dead zone where it cannot receive services from the BSS 102, or when the MS 100 is located in a radio dead zone, or when the MS 100 is located in other compromised communication environments, the communication link between the MS 100 and the BSS 102 is frequently and repeatedly disconnected. Communication is then resumed between the MS 100 and the BSS 102 by establishing a new communication link. Thus, when a communication link is repeatedly disconnected and subsequently recovered, the MS 100 repeatedly connects to services and disconnects from services, which are provided through the BSS 102.

These frequently repeated link disconnections and recoveries, waste valuable time during which the MS 100 attempts to connect to the aborted services. Additionally, a large amount of data for the previous services (which was aborted), which has already been transmitted before the disconnection, must be discarded due to the abnormal termination of the previously established services. This is an inefficient process which wastes time, system resources and energy. Moreover, users are oftentimes inconvenienced by discontinuous transmissions and subsequent reconnection attempts using the conventional method.

In a mobile communication system where communication link disconnection and recovery frequently occurs, an MS and a base station terminate the service in progress each time the communication link is disconnected, and then restart the service through a communication link which is reestablished between the MS and the base station. Data which has been previously transmitted and temporarily stored for the aborted service is generally discarded in such a link reestablishment procedure. Even when an MS briefly passes through the radio dead zone and a communication link is subsequently lost, it takes a much longer time for the MS to reconnect to the service through a handoff to a new base station after releasing all resources for communication with the previous BSS. The reconnection process increases the load on both the MS and the BSS.

SUMMARY OF THE INVENTION

Therefore, the present invention has been made in view of the above problem, and it is an object of the present invention to provide an apparatus and method for recovering a disconnected communication link in a mobile communication system, which ensures that a more stable communication service is provided between a base station to a MS in the mobile communication system having one or more radio dead zones where an MS normally does not receive communication services from a BSS.

In accordance with one aspect of the present invention, the above and other objects can be accomplished by the provision of an apparatus for recovering a communication link between a Mobile Station (MS) and a Base Station System (BSS) in a mobile communication system when the communication link is disconnected while a communication service is in progress between the MS and the BSS, the apparatus including the MS and the BSS, wherein if the communication link with the BSS is disconnected, the MS stores information of the communication link, and if the MS acquires a synchronization with the BSS within a predetermined time period from the disconnection, the MS resumes the communication service through the communication link, wherein if the communication link with the MS is disconnected, the BSS stores information about the resources which were allocated to the MS and other pertinent information about the MS, and if the BSS detects that the MS has acquired synchronization with the BSS within a predetermined time period from the disconnection, the BSS resumes the communication service with the MS through the communication link which was recovered due to the synchronization acquisition, and wherein the predetermined time period is based on a type of service being provided from the BSS to the MS.

In accordance with another aspect of the present invention, there is provided a method for recovering, by a MS, a communication link with a BSS when the communication link is disconnected while a communication service is in progress between the MS and the BSS in a mobile communication system, the method including if detecting that the communication link with the BSS is disconnected, storing information of the communication link and performing an operation required to reestablish the communication link with the BSS; and resuming the communication service through the communication link if the communication link with the BSS is reestablished within a predetermined time period from the detection, wherein the predetermined time period is based on a tyne of service being provided from the BSS to the MS.

In accordance with yet another aspect of the present invention, there is provided a method for recovering, by a BSS, a communication link with an MS when the communication link is disconnected while a communication service is in progress between the MS and the BSS in a mobile communication system, the method including if receiving no response from the MS, detecting that the communication link is disconnected, and storing information of resources allocated to the MS and other information of the MS; and resuming the communication service through the communication link if receiving a response from the MS within a predetermined time period from the detection, wherein the predetermined time period is based on a type of service being provided from the BSS to the MS.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention unclear.

The present invention is characterized in that when a physical transmission link between an MS and a BSS in a mobile communication system is disconnected while the two are in communication through the physical transmission link, both the MS and the BSS are prevented from terminating services, which were running between the BSS to the MS, for a predetermined time period after the disconnection. In other words, if a communication link between an MS and a base station is disconnected, the MS performs a procedure for reestablishing a communication link with the base station while retaining all information of services, which were being provided from the base station to the MS, for a predetermined time period after the disconnection. If a communication link is reestablished between the MS and the BSS within the predetermined time period from the disconnection, the MS resumes reception of the service. On the other hand, if the base station receives no response from the MS due to the communication link disconnection, the base station waits a predetermined time period for receipt of a response from the MS while maintaining resources allocated to the MS and information of the MS, instead of terminating the service immediately after the disconnection and releasing all of the resources allocated to the MS. If the base station receives a response from the MS within the predetermined time period after the disconnection, the base station resumes provision of the service, which was being provided to the MS, to the MS using the maintained resources and information of the MS.

Figure 1:
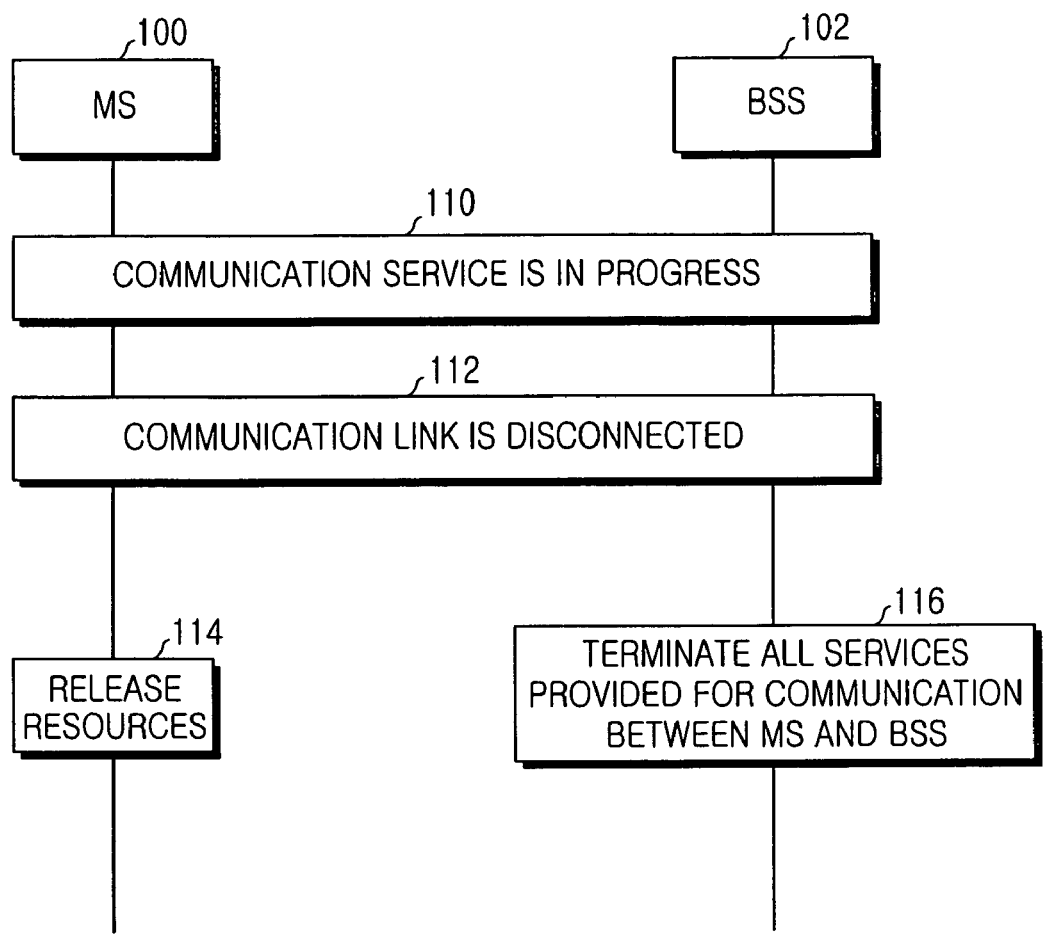
FIG. 1 is a flow diagram showing a conventional method for recovering a disconnected communication link in a general mobile communication system.
Figure 2:
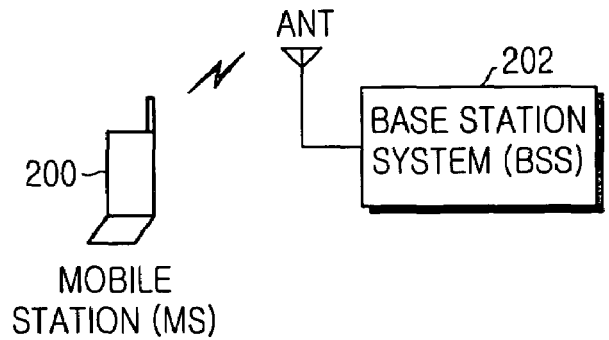
FIG. 2 is a diagram showing a mobile communication system for recovering a disconnected communication link using a synchronization failure report delay timer according to an embodiment of the present invention.

The configuration of a mobile communication system for performing a more stable communication service between an MS and a base station in the mobile communication system that has many radio dead zones where the MS cannot normally receive communication services will now be described with reference to FIG. 2.

An MS 200 is connected with a BSS 202 through an air interface when a call is established between the MS 200 and the BSS 202. The MS 200 can conduct voice communication and can also provide data communication services such as text and image data services. The BSS 202 to be connected wirelessly with the MS 200 includes a Base Transceiver Subsystem (BTS) and a Base Station Center (BSC) as will be described below with reference to FIGS. 3 and 4. The BTS is connected by wire with the BSC and is connected with the MS through an air interface when a call is established. If the BSC requests that the BTS establish a call with an MS, the BTS transmits a paging signal to the MS. If the BTS receives an outgoing call request signal from the MS, the BTS transfers the received request signal to the BSC. The BSC is connected to at least one BTS and performs overall call processing of calls such as voice and packet calls for each MS 200 which is currently using the BSS for communication.

The internal configuration of an MS 200 and a BSS 202 according to an embodiment of the present invention will now be described with reference to FIGS. 3 and 4.

Figure 3:
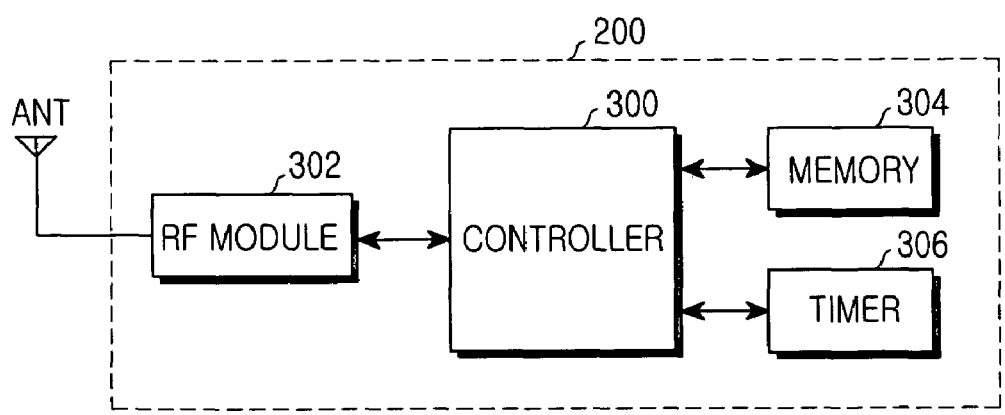
FIG. 3 is a block diagram showing the internal configuration of a MS according to an embodiment of the present invention.
Figure 4:
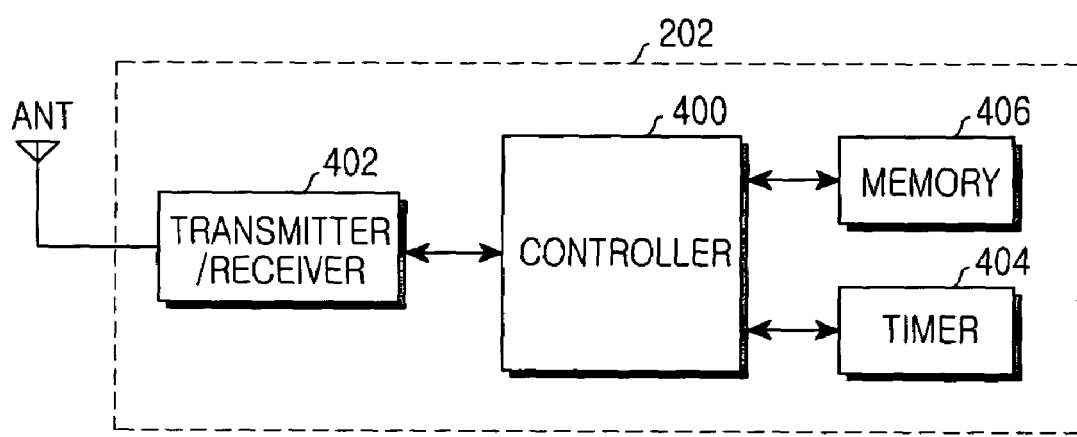
FIG. 4 is a block diagram showing the internal configuration of a BSS according to an embodiment of the present invention.

The MS 200 includes a controller 300, an RF module 302 and a memory 304 as shown in FIG. 3, and the BSS 202 includes a controller 400, a transmitter/receiver 402 and a memory 406 as shown in FIG. 4. According to the present invention, the MS 200 and the BSS 202 further include a timer 306 and a timer 404, respectively. The timers 306 and 404 are set to respective values based on the type of service that was in progress when the communication link between the MS 200 and the BSS 202 was disconnected during communication therebetween. If the MS 200 detects that the communication link with the BSS 202 becomes disconnected, the MS 200 activates the timer 306. If the BSS 202 receives no data from the MS 200 through an uplink channel allocated to the MS 200, the BSS 202 determines that the link is lost and then activates the timer 404. The MS 200 then performs a procedure for reestablishing a link with the BTS 202. The MS 200 and the BSS 202 wait while the timers 306 and 404 are running. During this wait time, the MS 200 and the BSS 202 maintain all of the parameters or resources required to maintain services which were being provided from the BSS 202 to the MS 200 before the link disconnection, without performing operations corresponding to the link disconnection.

The BSS 202 stores the information of resources or parameters required to maintain the services, which were being provided to the MS 200, in a memory 406. The MS 200 stores information of the disconnected communication link and continually stores data, which will be transmitted for resuming the service, in a memory 304.

If the link is reestablished between the MS 200 and the BSS 202 before the activated timers 306 and 404 expire, the BSS 202 resumes provision of the services to the MS 200. However, if the previous link is not reestablished between the MS 200 and the BSS 202 before the timers 306 and 404 expire, the MS 200 and the BSS 202 perform operations for terminating the services that were being provided.

In more detail, if the timer 404 set in the BSS 202 expires, the BSS 202 determines that it is not possible to recover the physical link with the MS 200, and thus terminates all services that were in progress with the MS 200. The BSS 202 also releases resources that have been allocated to the MS 200. Likewise, if the activated timer 306 set in the MS 200 expires, the MS 200 releases information that has been maintained in the MS 200, and then performs a handover process.

That is, when a communication link with the MS 200 is disconnected, the BSS 202 waits for reconnection with the MS 200 while maintaining the current services for a predetermined time period after the disconnection, instead of terminating the services and releasing all resources allocated to the MS 200 immediately after the communication link disconnection. If the BSS 202 receives no response from the MS 200 within the predetermined time period, the BSS 202 releases all resources that have been allocated to the MS 200.

According to the present invention, the timers 306 and 404 provided in the MS 200 and the BSS 202 can be set to fixed values, and also to variable values depending on the service type. For example, if the service, which was running between the MS 200 and the BSS 202, is a real-time service such as VoIP, the timers are set to a small value because the service would be meaninglessly maintained for a long time without transmitting real-time signals (such as voice communication signals or other signals which are sensitive to time delay) if the timers are set to a large value. On the other hand, in the case where a time delay due to a temporary suspension of the service would only cause a small problem (for example, when the service is a file transfer service), the timer is set to a large value so that the service can be kept fully stable.

Figure 5:
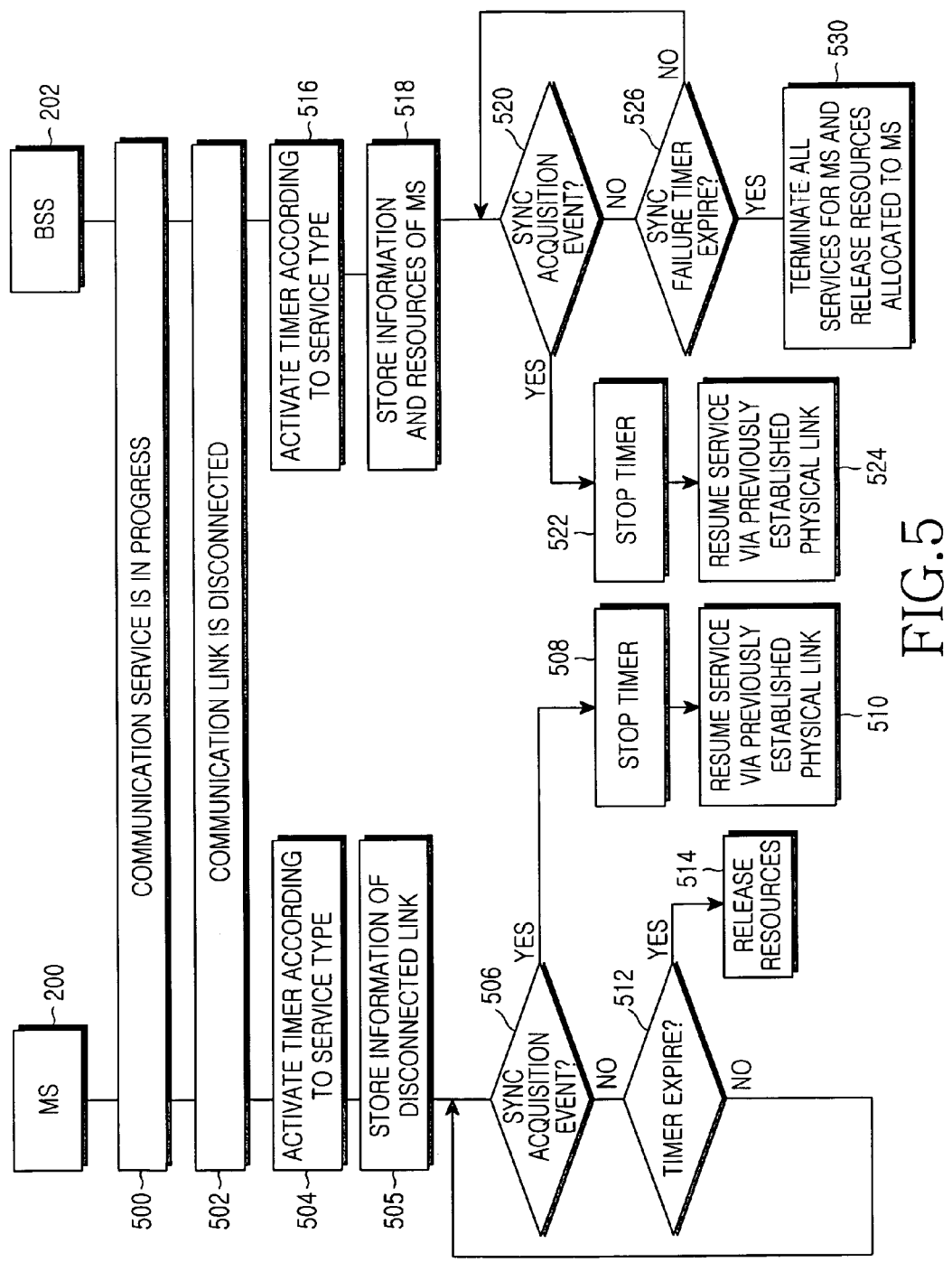
FIG. 5 is a flow diagram illustrating a method for recovering a disconnected communication link using a synchronization failure report delay timer according to an embodiment of the present invention.

A method for recovering a disconnected communication link between the MS 200 and the BSS 202 will now be described with reference to FIG. 5. which is a flow diagram illustrating a method for recovering the disconnected communication link using a synchronization failure report delay timer according to an embodiment of the present invention.

The MS 200 and the BSS 202 are communicating with each other as shown in step 500. At step 502, if a synchronization failure event (for example, a communication link disconnection) occurs (while a communication service is in progress at step 500 through a communication link established using a wired/wireless channel between the MS 200 and the BSS 202), the MS 200 and the BSS 202 activate their timers 306 and 404 based on the type of the communication service at steps 504 and 516. As the timers 306 and 404 are activated, a procedure for reestablishing a link between the MS 200 and the BSS 202 is performed.

The MS 200 and the BSS 202 wait while the timers 306 and 404 in the MS 200 and the BSS 202 are running. During this wait time, the MS 200 and the BSS 202 maintain all of the parameters or resources required to maintain the communication service that was in progress. That is, to maintain the communication service, the MS 200 stores information of the disconnected communication link at step 505, and the BSS 202 stores information of resources allocated to the MS 200 and other information of the MS 200 at step 518.

Thereafter, the MS 200 checks, at step 506, whether a synchronization acquisition event occurs while the timer 306 is running. If a synchronization acquisition event occurs, the MS 200 moves to step 508 to stop and reset the timer 306. Thereafter, the MS 200 moves to step 510 to resume reception of the communication service through a recovered communication link with the BSS 202.

On the contrary, if no synchronization acquisition event occurs at step 506, the MS 200 checks whether the timer 306 has expired. If the timer 306 has expired without a synchronization acquisition event, the MS 200 moves to step 514 to perform a resource release procedure in which the MS 200 deletes all the information about the communication link that had previously been established with the BSS 202.

On the other hand, when the timer 404 in the BSS 202 is activated at step 516, the BSS 202 first stores information of the MS 200 required to maintain the communication service at step 518, and then, at step 520, the BSS 202 checks whether a synchronization acquisition event has occurred. If a synchronization acquisition event has occurred, the BSS 202 moves to step 522 to stop and reset the timer 404. The BSS 202 then moves to step 524 to resume provision of the communication service which had previously been established through a recovered communication link.

If it is determined at step 526 that the timer 404 has expired without a synchronization acquisition event, the BSS 202 moves to step 530. At step 530, the BSS 202 determines that the physical link with the MS 202 cannot be recovered, and then terminates all services that were running between the MS 200 and the BSS 202, and also releases resources that have been allocated to the MS 200. On the other hand, if it is determined at step 526 that the synchronization failure timer 404 has not expired, the BSS 202 continues to wait for a response from the MS 200, and returns to step 520.

As described above, if a communication link between the MS 200 and the BSS 202 is disconnected while a communication service is being provided from the BSS 202 to the MS 200, the MS 200 and the BSS 202 wait a predetermined time after the disconnection until the MS 200 reestablishes the communication link with the BSS 202, without terminating the communication service. During this wait time, the MS 200 and the BSS 202 retain information required to maintain the communication service. If the MS 200 reestablishes the communication link within the predetermined time period from the disconnection, the BSS 202 resumes provision of the maintained communication service to the MS 200.

As is apparent from the above description, the present invention provides an apparatus and method for recovering a disconnected communication link in a mobile communication system, which has the following features and advantages. If an MS reestablishes a communication link with a base station within a predetermined time after the communication link was disconnected while a communication service was being provided from the base station to the MS, the base station resumes provision of the communication service to the MS without terminating the communication service. This allows the base station to provide a more stable communication service to the MS in a mobile communication system that has one or more radio dead zones where the MS cannot normally receive communication services. Additionally, the MS and the base station are prevented from repeatedly terminating and restarting all services being provided from the base station to the MS through a communication link, as in the prior art, each time the communication link is disconnected. This reduces the load on both the MS and the base station.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recovering a communication link between a Mobile Station (MS) and a Base Station System (BSS) in a mobile communication system when the communication link is disconnected while a communication service is in progress between the MS and the BSS, the apparatus comprising the MS and the BSS, wherein if the communication link with the BSS is disconnected, the MS stores information of the communication link, and if the MS acquires synchronization with the BSS within a predetermined time period from the disconnection, the MS resumes the communication service through the communication link, wherein if the communication link with the MS is disconnected, the BSS stores information of resources allocated to the MS and other information of the MS, and if the BSS detects that the MS has acquired synchronization with the BSS within the predetermined time period from the disconnection, the BSS resumes the communication service through the communication link recovered due to the synchronization acquisition, and wherein the predetermined time period is based on a type of service being provided from the BSS to the MS.

2. The apparatus according to claim 1, wherein if the MS does not acquire synchronization with the BSS within the predetermined time period, the MS releases resources for communication with the BSS and performs handoff.

3. The apparatus according to claim 1, wherein if the BSS does not receive a synchronization message from the MS within the predetermined time period, the BSS determines that the communication link with the MS cannot be recovered, and terminates the communication service being provided to the MS and also releases resources allocated to the MS.

4. The apparatus according to claim 1, further comprising one or more timers for counting the predetermined time period.

5. The apparatus according to claim 4, wherein at least one of the timers is set to a value which is based on the type of service being provided from the BSS to the MS.

6. The apparatus according to claim 5, wherein for real-time services being provided from the BSS to the MS, at least one of the timers is set to a small value, and for services which are not as sensitive to time-delay caused by a temporary suspension of the service, at least one of the timers is set to a large value, so that the services can be kept fully stable.

7. A method for recovering, by a Mobile Station (MS), a communication link with a Base Station System (BSS) when the communication link is disconnected while a communication service is in progress between the MS and the BSS in a mobile communication system, the method comprising:

if disconnection of the communication link with the BSS is detected, storing information of the communication link and performing an operation required to reestablish the communication link with the BSS; and resuming the communication service through the communication link if the communication link with the BSS is reestablished within a predetermined time period from the detection, wherein the predetermined time period is based on a type of service being provided from the BSS to the MS.

8. The method according to claim 7, further comprising:

releasing resources for communication with the BSS and performing handoff if synchronization with the BSS is not acquired within the predetermined time period.

9. The method according to claim 7, wherein for real-time services being provided from the BSS to the MS, at least one of the predetermined time periods is set to a small value, and for services which are not as sensitive to time-delays caused by a temporary suspension of the services, at least one of the predetermined time periods is set to a large value, so that a full stability of the services can be maintained.

10. A method for recovering, by a Base Station System (BSS), a communication link with a Mobile Station (MS) when the communication link is disconnected while a communication service is in progress between the MS and the BSS in a mobile communication system, the method comprising:

if no response from the MS is received, detecting that the communication link is disconnected, and storing information of resources allocated to the MS and other information of the MS; and resuming the communication service through the communication link if a response from the MS is received within a predetermined time period from the detection, wherein the predetermined time period is based on a type of service being provided from the BSS to the MS.

11. The method according to claim 10, further comprising:

if no response from the MS is received within the predetermined time period, determining that the communication link with the MS cannot be recovered, and releasing resources that have been allocated to the MS for providing the communication service to the MS.

12. The method according to claim 10, wherein for real-time services being provided from the BSS to the MS, at least one of the predetermined time periods is set to a small value, and for services which are not as sensitive to time-delays caused by a temporary suspension of the service, at least one of the predetermined time periods is set to a large value, so that a full stability of the services can be maintained.

* * * * *